United States Patent
Kikuchi et al.

(10) Patent No.: US 12,294,291 B2
(45) Date of Patent: May 6, 2025

(54) POWER CONVERSION SYSTEM

(71) Applicant: Mitsubishi Electric Corporation, Tokyo (JP)

(72) Inventors: Takeshi Kikuchi, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 17/792,221

(22) PCT Filed: Mar. 4, 2020

(86) PCT No.: PCT/JP2020/009252
§ 371 (c)(1),
(2) Date: Jul. 12, 2022

(87) PCT Pub. No.: WO2021/176615
PCT Pub. Date: Sep. 10, 2021

(65) Prior Publication Data
US 2023/0098992 A1 Mar. 30, 2023

(51) Int. Cl.
*H02M 7/483* (2007.01)
*H02M 1/32* (2007.01)
*H02M 1/34* (2007.01)

(52) U.S. Cl.
CPC ............. *H02M 1/32* (2013.01); *H02M 1/348* (2021.05); *H02M 7/4835* (2021.05)

(58) Field of Classification Search
CPC .................................................. H02M 7/4835
See application file for complete search history.

(56) References Cited

U.S. PATENT DOCUMENTS

2013/0229739 A1* 9/2013 Juhlin ..................... H02M 1/32
361/86
2016/0126827 A1* 5/2016 Dong .................. H02M 7/4835
363/50

(Continued)

FOREIGN PATENT DOCUMENTS

CN 105406743 A 3/2016
JP S5951426 A 3/1984

(Continued)

OTHER PUBLICATIONS

Extended European Search Report dated Mar. 16, 2023, issued in the corresponding European Patent Application No. 20923333.7, 9 pages.

(Continued)

*Primary Examiner* — Peter M Novak
(74) *Attorney, Agent, or Firm* — BUCHANAN, INGERSOLL & ROONEY PC (57) ABSTRACT

A voltage generated in a DC line at the time when a sub module is deactivated in the event of a short-circuiting fault in the DC line is suppressed. A power conversion system includes a power converter including a leg circuit, a control device, and a voltage suppression circuit connected to a DC line. The leg circuit includes a plurality of sub modules connected in series, and at least one of them is a first sub module implemented by a sub module in a full-bridge configuration or a 1.5 half-bridge configuration. When the control device detects a short-circuiting fault in the DC line, it stops a switching operation of the plurality of sub modules. The voltage suppression circuit is configured to suppress a voltage generated in the DC line when the switching operation is stopped.

3 Claims, 11 Drawing Sheets

(56) References Cited

U.S. PATENT DOCUMENTS

2018/0159422 A1    6/2018   Kikuchi et al.
2019/0312504 A1*  10/2019   Kim ........................ H02M 1/32

FOREIGN PATENT DOCUMENTS

| JP | 2000090787 A | 3/2000 |
|---|---|---|
| WO | 2016107616 A1 | 7/2016 |
| WO | 2017010388 A1 | 1/2017 |

OTHER PUBLICATIONS

Nguyen, et al., "A Novel Submodule Topology of MMC for Blocking DC-Fault Currents in HVDC Transmission Systems", 9th International Conference on Power Electronics—ECCE Asia, 2015, pp. 2057-2063.

Vidal-Albalate, et al., "Analysis of the Performance of MMC Under Fault Conditions in HVDC-Based Offshore Wind Farms", IEEE Transactions on Power Delivery, vol. 31, No. 2, Apr. 2016, pp. 839-847.

International Search Report (PCT/ISA/210) with translation and Written Opinion (PCT/ISA/237) mailed on Jun. 23, 2020, by the Japan Patent Office as the International Searching Authority for International Application No. PCT/JP2020/009252.

Communication pursuant to Article 94(3) EPC dated Jul. 24, 2024, issued in the corresponding European Patent Application No. 20923333.7, 8 pages.

Zeng, et al., "Design and Operation of a Hybrid Modular Multilevel Converter", IEEE Transactions on Power Electronics, vol. 30, No. 3, Mar. 2015, pp. 1137-1146.

* cited by examiner

POWER CONVERSION SYSTEM

TECHNICAL FIELD

The present disclosure relates to a power conversion system.

BACKGROUND ART

A modular multilevel converter (which is also referred to as an MMC converter below) composed of a plurality of cascade-connected unit converters can readily adapt to a higher voltage by increasing the number of unit converters. The "unit converter" is also referred to as a "sub module" or a "converter cell." The MMC converter has widely been applied to a power transmission and distribution system as a large-capacity static var compensator or a power conversion device for high-voltage direct-current (DC) power transmission.

WO2017/010388 (PTL 1) disclose adoption of a 1.5 bridge configuration or a full-bridge configuration as a configuration of the sub module.

CITATION LIST

Patent Literature

PTL 1: WO2017/010388

SUMMARY OF INVENTION

Technical Problem

PTL 1 describes suppression of a fault current by outputting the sum of capacitor voltages of converter cells in the 1.5 bridge configuration to a DC terminal of a power converter by gate blocking of the converter cells in the event of a DC short-circuiting fault. At that time, however, an oscillatory voltage may disadvantageously be generated in a DC line by current energy accumulated in the DC line.

An object in one aspect of the present disclosure is to provide a power conversion system capable of suppressing a voltage generated in a DC line at the time when a sub module is deactivated in the event of a short-circuiting fault in the DC line.

Solution to Problem

According to one embodiment, a power conversion system that converts electric power between a DC line and an alternating-current (AC) system is provided. The power conversion system includes a power converter including a plurality of leg circuits corresponding to a plurality of phases of the AC system, respectively, a control device to control an operation of the power converter, and a voltage suppression circuit connected to the DC line. Each of the leg circuits includes a plurality of sub modules connected in series. At least one of the plurality of sub modules is a first sub module. The first sub module includes a first energy accumulation element, a first semiconductor circuit including a plurality of switching elements connected in series, and a second semiconductor circuit. The first energy accumulation element, the first semiconductor circuit, and the second semiconductor circuit are connected in parallel to one another. The second semiconductor circuit is composed of a plurality of switching elements connected in series or composed of a switching element and a diode connected in series. When the control device detects a short-circuiting fault in the DC line, the control device stops a switching operation of the plurality of sub modules included in each of the leg circuits. The voltage suppression circuit is configured to suppress a voltage generated in the DC line when the switching operation of the plurality of sub modules is stopped.

Advantageous Effects of Invention

According to the present disclosure, a voltage generated in the DC line at the time when the sub module is deactivated in the event of a short-circuiting fault in the DC line can be suppressed.

DESCRIPTION OF EMBODIMENTS

An embodiment of the present disclosure will be described below with reference to the drawings. In the description below, the same elements have the same reference characters allotted and their labels and functions are also the same. Therefore, detailed description thereof will not be repeated.

Overall Configuration of System

Figure 1:
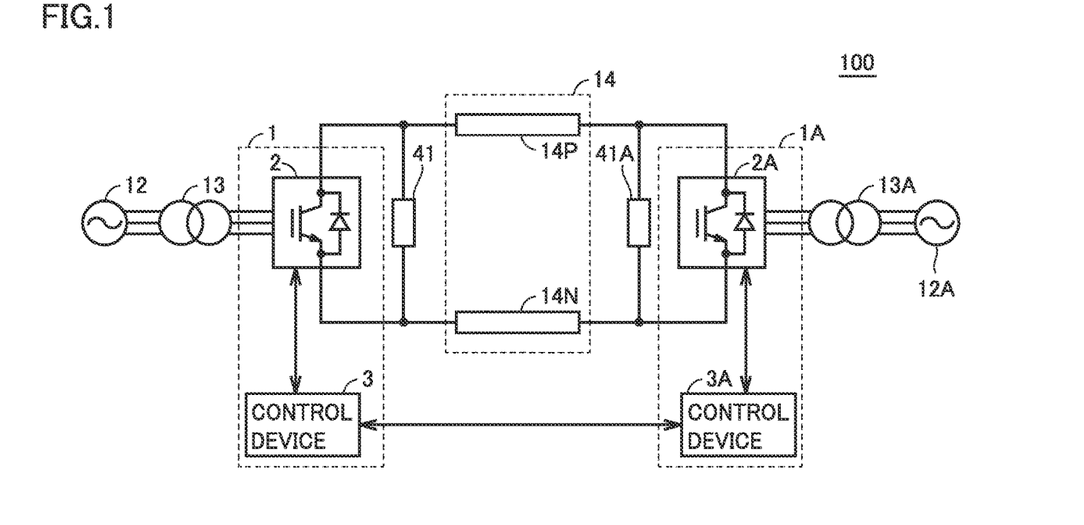
FIG. 1 is a diagram showing a schematic configuration of a power conversion system.

FIG. 1 is a diagram showing a schematic configuration of a power conversion system 100. Referring to FIG. 1, power conversion system 100 is a system for controlling electric power of a DC power transmission system of a monopolar configuration. Electric power is transmitted and received between two AC systems 12 and 12A through a DC line 14P on a positive side and a DC line 14N on a negative side that form a DC line 14. AC systems 12 and 12A are each a three-phase AC system.

When power conversion system 100 is adapted to a high voltage direct current (HVDC) system in FIG. 1, DC lines 14P and 14N each have a length, for example, from several ten kilometers to several hundred kilometers. When power conversion system 100 is adapted to a back to back (BTB) system, DC lines 14P and 14N each have a length, for example, from several meters to several ten meters. FIG. 1 shows an example in which a DC system includes two terminals.

A power conversion device 1 includes a self-excited power converter 2 to convert electric power between DC line 14 and AC system 12 and a control device 3. Typically, power converter 2 is implemented by a power converter of an MMC conversion type. Power converter 2 is connected to DC lines 14P and 14N. Power converter 2 is connected to AC system 12 with a transformer 13 being interposed. Control device 3 controls an operation of power converter 2. Control device 3 is configured to communicate with a control device 3A.

A power conversion device 1A includes a self-excited power converter 2A and control device 3A. Power converter 2A is connected to power converter 2 through DC lines 14P and 14N. Power converter 2A is connected to AC system 12A with a transformer 13A being interposed. Control device 3A controls an operation of power converter 2A. Power conversion device 1A is similar in configuration to power conversion device 1.

When electric power is transmitted from AC system 12 to AC system 12A, power converter 2 operates as a rectifier (REC) and power converter 2A operates as an inverter (INV). Specifically, power converter 2 converts AC power to DC power, and resultant DC power is DC-transmitted through DC lines 14P and 14N. At a power reception end, power converter 2A converts DC power to AC power and resultant AC power is supplied to AC system 12A through transformer 13A. When power converter 2 operates as the inverter and power converter 2A operates as the rectifier, a conversion operation reverse to the above is performed. In the present embodiment, power converter 2 is assumed as a rectifier at a power transmission end and power converter 2A is assumed as an inverter at the power reception end.

Transformer 13 is connected between AC system 12 and power converter 2. Specifically, AC system 12 is connected to a primary side of transformer 13, and power converter 2 is connected to a secondary side thereof. Transformer 13A is connected between AC system 12A and power converter 2A. Specifically, AC system 12A is connected to a primary side of transformer 13A and power converter 2A is connected to a secondary side thereof.

Voltage suppression circuits 41 and 41A are connected to DC line 14. Specifically, voltage suppression circuit 41 is connected between DC line 14P on the positive side and DC line 14N on the negative side on a side of the power transmission end (that is, a side of power converter 2). Voltage suppression circuit 41A is connected between DC line 14P on the positive side and DC line 14N on the negative side on a side of the power reception end (that is, a side of power converter 2A).

Voltage suppression circuit 41 suppresses an oscillatory voltage generated in DC line 14 at the time when each sub module within power converter 2 is deactivated due to a short-circuiting fault in DC line 14. Voltage suppression circuit 41A suppresses an oscillatory voltage generated in DC line 14 at the time when each sub module within power converter 2A is deactivated due to a short-circuiting fault in DC line 14.

Configuration of Power Conversion Device

Figure 2:
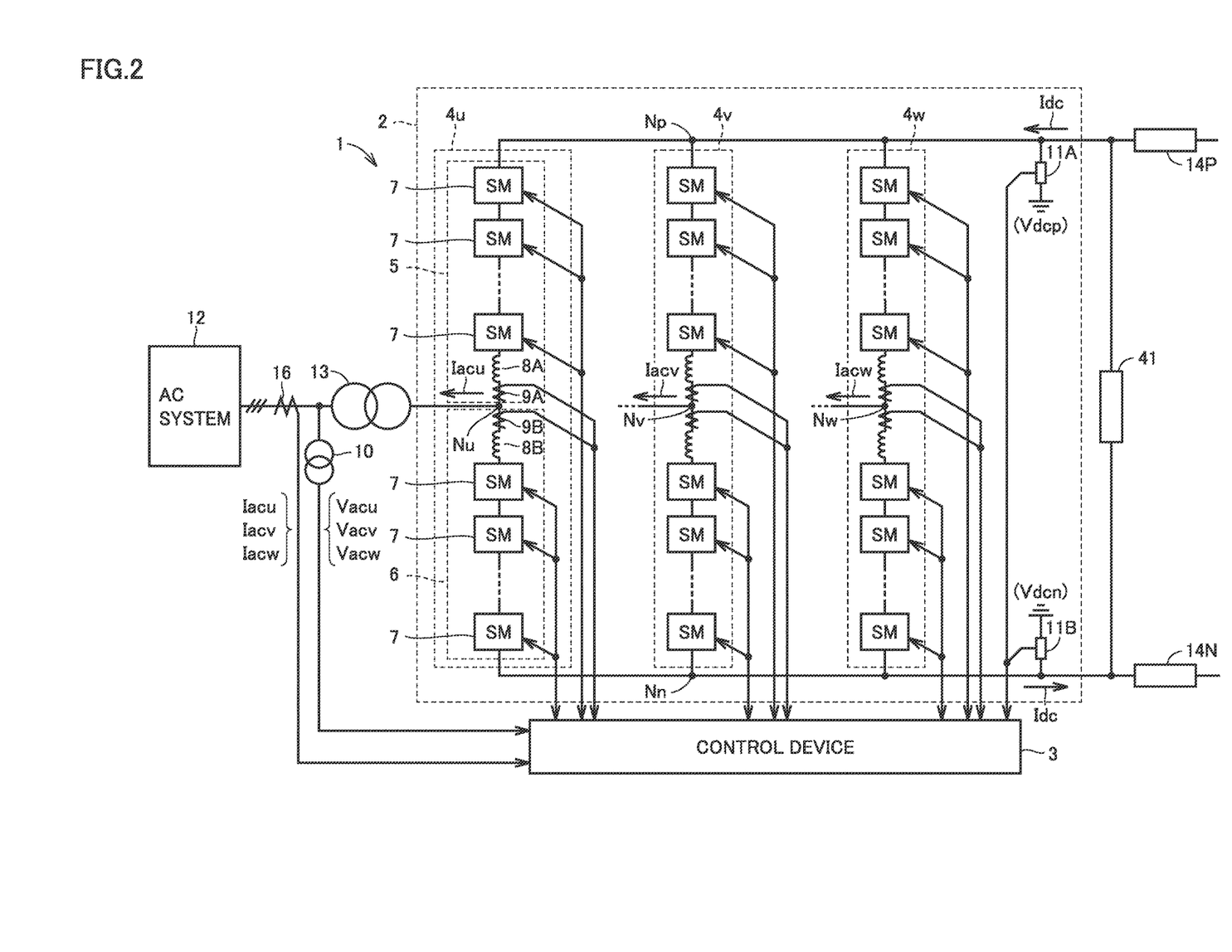
FIG. 2 is a schematic configuration diagram of a power conversion device.

FIG. 2 is a schematic configuration diagram of power conversion device 1. Referring to FIG. 2, power conversion device 1 is configured of an MMC converter which includes multiple sub modules (corresponding to "SM" in FIG. 2) 7 connected in series.

Power converter 2 includes multiple leg circuits 4u, 4v, 4w (will be described as a "leg circuit 4" when referred to collectively or when referring to any leg circuit) which are connected in parallel between a positive DC terminal (i.e., a high-potential-side DC terminal) Np and a negative DC terminal (i.e., a low-potential-side DC terminal) Nn.

Leg circuit 4 is provided for each of multiple phases constituting an alternating current. Leg circuit 4 is connected between AC system 12 and DC line 14, and converts power between the systems. Three leg circuits 4u, 4v, 4w corresponding to a U phase, a V phase, and a W phase, respectively are provided in power converter 2.

AC input terminals Nu, Nv, Nw provided for respective leg circuits 4u, 4v, 4w are connected to AC system 12 via transformer 13. For ease of illustration, FIG. 2 does not show connection between AC input terminals Nv, Nw and transformer 13. Positive DC terminal Np and negative DC terminal Nn connected in common to each leg circuit 4 are connected to DC line 14.

Leg circuit 4u includes an upper arm 5 from positive DC terminal Np to AC input terminal Nu and a lower arm 6 from negative DC terminal Nn to AC input terminal Nu. AC input terminal Nu, which is the point of connection between upper arm 5 and lower arm 6, is connected to transformer 13. Leg circuits 4v, 4w have the same configuration as leg circuit 4u, and leg circuit 4u will thus be representatively described below.

Upper arm 5 includes multiple cascade-connected sub modules 7 and a reactor 8A. Multiple sub modules 7 and reactor 8A are connected in series to each other. Lower arm 6 includes multiple cascade-connected sub modules 7 and a reactor 8B. Multiple sub modules 7 and reactor 8B are connected in series to each other. Upper arm 5 and lower arm 6 may be connected to AC system 12 instead of the reactor, with a three-winding transformer comparable in impedance to the reactor being interposed.

As detectors for measuring the electrical quantities (for example, current, voltage, etc.) for use in the control, power conversion device 1 includes an AC voltage detector 10, an AC current detector 16, DC voltage detectors 11A, 11B, and arm current detectors 9A, 9B. Arm current detectors 9A, 9B are provided for each leg circuit 4. Signals detected by these detectors are input to control device 3.

Control device 3 provides an operation command for controlling an operating state of each sub module 7 based on these detection signals. The operation command is generated in correspondence with each of the upper arm of the U phase, the lower arm of the U phase, the upper arm of the V phase, the lower arm of the V phase, the upper arm of the W phase, and the lower arm of the W phase. Control device 3 receives various types of information from each sub module 7. The various types of information are internal information of sub module 7, and includes a voltage value of a capacitor in sub module 7 and state information representing a state of sub module 7.

Control device 3 typically includes an auxiliary transformer, an analog to digital (AD) conversion unit, an arithmetic processing unit, and the like as a hardware configuration. The arithmetic processing unit includes a central processing unit (CPU), a random access memory (RAM), and a read only memory (ROM). The AD conversion unit includes an analog filter, a sample-and-hold circuit, a multiplexer, and the like. Control device 3 may be implemented, for example, by a digital protection control device.

Note that, for ease of illustration, in FIG. 2, some of signal lines for the signals input from the detectors to control device 3 and signal lines for the signals input/output to/from control device 3 and each sub module 7 are depicted collectively, but they are, in practice, provided for each detector and each sub module 7. The signal lines may be provided separately for transmission and reception of the signals between each sub module 7 and control device 3. For example, an optical fiber may be adopted as the signal line.

AC voltage detector 10 detects a U-phase AC voltage Vacu, a V-phase AC voltage Vacv, and a W-phase AC voltage Vacw of AC system 12. AC current detector 16 detects a U-phase AC current Iacu, a V-phase AC current Iacv, and a W-phase AC current Iacw of AC system 12. DC voltage detector 11A detects a DC voltage Vdcp of positive DC terminal Np connected to DC line 14. DC voltage detector 11B detects a DC voltage Vdcn of negative DC terminal Nn connected to DC line 14. A difference between DC voltage Vdcp and DC voltage Vdcn is defined as a DC voltage Vdc.

Arm current detectors 9A and 9B, included in leg circuit 4u for U phase, respectively detect an arm current Ipu flowing through upper arm 5 and an arm current Inu flowing through lower arm 6. Similarly, arm current detectors 9A and 9B, included in leg circuit 4v for V phase, detect an arm current Ipv and an arm current Inv, respectively. Arm current detectors 9A and 9B, included in leg circuit 4w for W phase, detect an arm current Ipw and an arm current Inw, respectively.

Configuration of Sub Module

Figure 3:
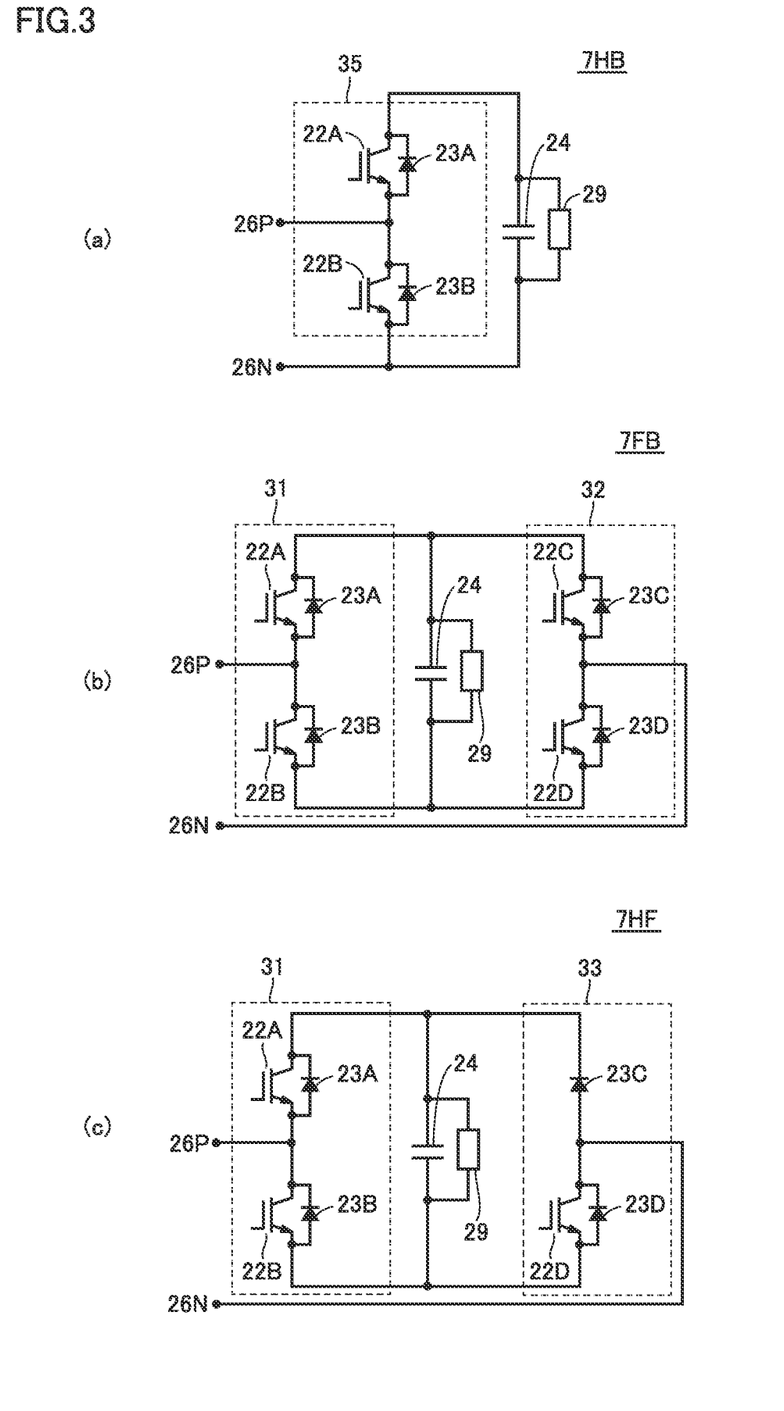
FIG. 3 is a circuit diagram showing an exemplary sub module included in each leg circuit in FIG. 2.

FIG. 3 is a circuit diagram showing an exemplary sub module included in each leg circuit in FIG. 2. Specifically, sub module 7 shown in FIG. 3 (a) has a circuit configuration called a half-bridge configuration. "Sub module 7" in the circuit configuration in FIG. 3 (a) is also referred to as a "sub module 7HB" below.

Sub module 7HB includes a semiconductor circuit 35 and a capacitor 24 which is an energy accumulation element. Semiconductor circuit 35 is composed of a plurality of switching elements connected in series. Specifically, semiconductor circuit 35 includes two switching elements 22A and 22B connected in series and diodes 23A and 23B. Diodes 23A and 23B are diodes connected in anti-parallel (that is, in parallel and in a reverse bias direction) to respective switching elements 22A and 22B. Capacitor 24 is connected in parallel to semiconductor circuit 35 and holds a DC voltage. Voltage detector 29 detects a voltage across opposing ends of capacitor 24. In the description below, a voltage across opposing ends of capacitor 24 is also referred to as a voltage Vc. A signal indicating voltage Vc is transmitted to control device 3.

Opposing terminals of switching element 22B are referred to as input/output terminals 26P and 26N. Specifically, a node of connection between switching elements 22A and 22B is connected to input/output terminal 26P on the high potential side. A node of connection between switching element 22B and capacitor 24 is connected to input/output terminal 26N on the low potential side. Typically, input/output terminal 26P is connected to input/output terminal 26N of sub module 7 adjacent on the positive side. Input/output terminal 26N is connected to input/output terminal 26P of sub module 7 adjacent on the negative side.

As a result of switching operations by switching elements 22A and 22B, a voltage across ends of capacitor 24 and a zero voltage are provided between the input/output terminals of sub module 7HB. For example, when switching element 22A is turned on and switching element 22B is turned off, the voltage across ends of capacitor 24 is provided. When switching element 22A is turned off and switching element 22B is turned on, the zero voltage is provided.

Sub module 7 shown in FIG. 3 (b) is in a circuit configuration called a full-bridge configuration. "Sub module 7" in the circuit configuration in FIG. 3 (b) is also referred to as a "sub module 7FB" below.

Sub module 7FB includes a semiconductor circuit 31, capacitor 24, and a semiconductor circuit 32. Semiconductor circuit 31, capacitor 24, and semiconductor circuit 32 are connected in parallel to one another. Semiconductor circuit 31 is identical to semiconductor circuit 35 in FIG. 3 (a). Therefore, sub module 7FB substantially has such a circuit configuration that semiconductor circuit 32 is added to sub module 7HB. Semiconductor circuit 32 includes two switching elements 22C and 22D connected in series and diodes 23C and 23D connected in anti-parallel to switching elements 22C and 22D, respectively.

A point intermediate between switching element 22A and switching element 22B is defined as input/output terminal 26P of sub module 7FB and a point intermediate between switching element 22C and switching element 22D is defined as input/output terminal 26N. Sub module 7FB provides a positive voltage or a zero voltage by keeping switching element 22D always on, keeping switching element 22C always off, and alternately setting switching elements 22A and 22B to on. Sub module 7FB provides a zero voltage or a negative voltage by keeping switching element 22D always off, keeping switching element 22C always on, and alternately setting switching elements 22A and 22B to on.

Sub module 7 shown in FIG. 3 (c) is in a circuit configuration also called a 1.5 half-bridge configuration. "Sub module 7" in the circuit configuration in FIG. 3 (c) is also referred to as a "sub module 7HF" below.

Sub module 7HF includes semiconductor circuit 31, capacitor 24, and a semiconductor circuit 33. Semiconductor circuit 31, capacitor 24, and semiconductor circuit 33 are connected in parallel to one another. Sub module 7HF is in such a configuration that semiconductor circuit 32 of sub module 7FB is replaced with semiconductor circuit 33. Semiconductor circuit 33 includes diode 23C, switching element 22D, and diode 23D connected in anti-parallel to switching element 22D. Diode 23C and switching element 22D are connected in series.

The point intermediate between switching element 22A and switching element 22B is defined as input/output terminal 26P of sub module 7HF and the point intermediate between diode 23C and switching element 22D is defined as input/output terminal 26N. Sub module 7HF provides a positive voltage or a zero voltage by keeping switching element 22D always on, keeping switching element 22C always off, and alternately setting switching elements 22A and 22B to on.

A self-arc-extinguishing switching element, an on operation and an off operation of which are both controllable, is employed for each of switching elements 22A to 22D (which are also collectively referred to as a "switching element 22" below) shown in FIG. 3. Switching elements 22A to 22D are each, for example, a self-arc-extinguishing semiconductor switching element such as an insulated gate bipolar transistor (IGBT), a gate commutated turn-off (GCT) thyristor, or a metal oxide semiconductor field-effect transistor (MOS- FET). In FIG. 3, a metal evaporated film capacitor or the like is mainly employed for capacitor 24.

Suppression of Short-Circuiting Current by Power Converter

In the present embodiment, a defined number of sub modules 7 among the plurality of sub modules 7 that form each leg circuit 4 are implemented by sub module 7FB or sub module 7HF, and remaining sub modules 7 are implemented by sub modules 7HB. A short-circuiting current in the event of a short-circuiting fault in DC line 14 is thus suppressed. Initially, a path of a short-circuiting current in a comparative example in which all of the plurality of sub modules 7 are implemented by sub modules 7HB will be described.

Figure 4:
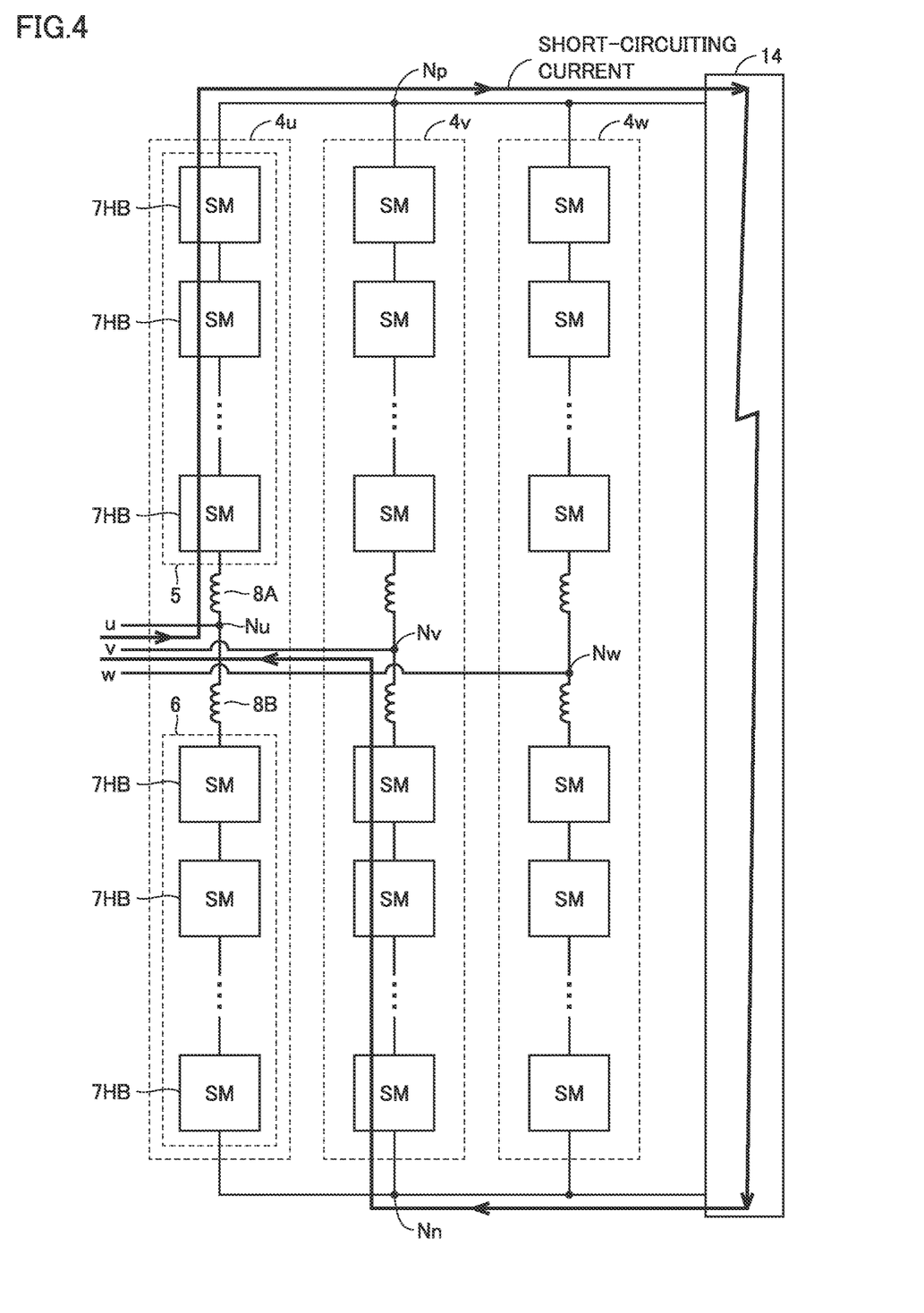
FIG. 4 is a diagram showing a path of a short-circuiting current in a comparative example.

FIG. 4 is a diagram showing a path of a short-circuiting current in the comparative example. Referring to FIG. 4, a short-circuiting current that flows through the inside of DC line 14 from the high-potential side toward the low-potential side flows through the inside of the power conversion device through a path in the order of AC input terminal Nu, positive DC terminal Np, negative DC terminal Nn, and AC input terminal Nv. In which of upper arm 5 and lower arm 6 in each of leg circuits 4u, 4v, and 4w the short-circuiting current flows is different depending on a phase of an AC current that flows between AC system 12 and the power conversion device. In the case of FIG. 4, the short-circuiting current flows in a direction from AC system 12 through upper arm 5 of the U phase toward positive DC terminal Np, and the short-circuiting current flows from negative DC terminal Nn through lower arm 6 of the V phase to AC system 12.

The control device of the power conversion device directly or indirectly detects a current that flows through each switching element. Typically, when the control device determines that short-circuiting has occurred based on the detected arm current, it turns off each switching element within the power conversion device. In a half-bridge configuration as in sub module 7HB, however, even when each switching element is turned off as shown in FIG. 3 (a), the path of the short-circuiting current in the direction from input/output terminal 26N toward input/output terminal 26P is maintained and an excessive short-circuiting current flows because a diode (that is, diode 23B) connected in antiparallel is present.

Figure 5:
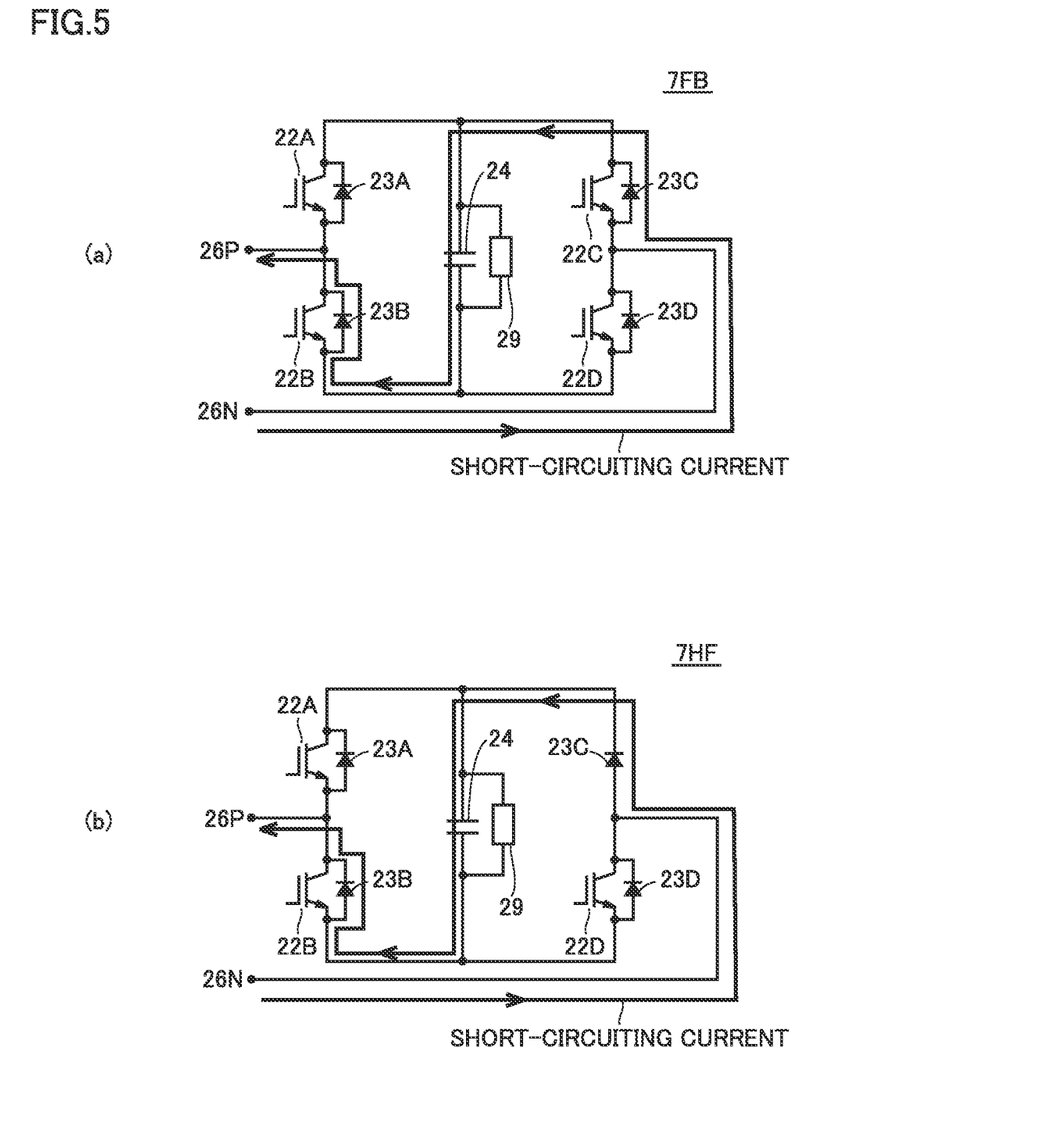
FIG. 5 is a diagram showing a path of a short-circuiting current within the sub module according to the present embodiment.

A configuration including sub module 7FB or 7HF will now be described. FIG. 5 is a diagram showing a path of a short-circuiting current within sub module 7 according to the present embodiment. Specifically, FIG. 5 (a) shows a path of a short-circuiting current within sub module 7FB and FIG. 5 (b) shows a path of a short-circuiting current within sub module 7HF.

Referring to FIG. 5, for example, when control device 3 detects a short-circuiting fault in DC line 14 based on detected arm current Iarm, it stops a switching operation of each sub module 7 included in each leg circuit 4 (that is, turns off each switching element 22). In this case, each sub module 7 is in a gate blocked state. At this time, as shown in FIGS. 5 (a) and (b), the short-circuiting current flows through a path in the order from input/output terminal 26N through diode 23C, capacitor 24, and diode 23B to input/output terminal 26P. In other words, when control device 3 turns off each switching element 22, a short-circuiting path like a diode rectifier is formed.

In this case, since diodes 23B and 23C are not conducting unless a voltage across input/output terminals 26P and 26N of sub module 7FB or 7HF is higher than voltage Vc, the short-circuiting current does not flow. In other words, when the voltage across input/output terminals 26P and 26N is equal to or lower than voltage Vc, the short-circuiting current can be suppressed. Since input/output terminals 26P and 26N are connected in series, generally, the short-circuiting current can be suppressed so long as the voltage (for example, an AC grid voltage) of AC system 12 is equal to or lower than the total of voltages Vc of capacitors 24 present on the path of the short-circuiting current.

Since the sum of capacitor voltages is set to be higher than the voltage of AC system 12 for the purpose to maintain the operation in a steady state in power conversion devices 1 and 1A according to the present embodiment, the short-circuiting current does not flow. Even though the short-circuiting current temporarily flows, capacitor 24 is charged and voltage Vc further increases, which functions to lower the short-circuiting current and finally to suppress the short-circuiting current. Sub modules 7FB and 7HF that perform a function to suppress the short-circuiting current are also collectively referred to as a "sub module 7SU."

Figure 6:
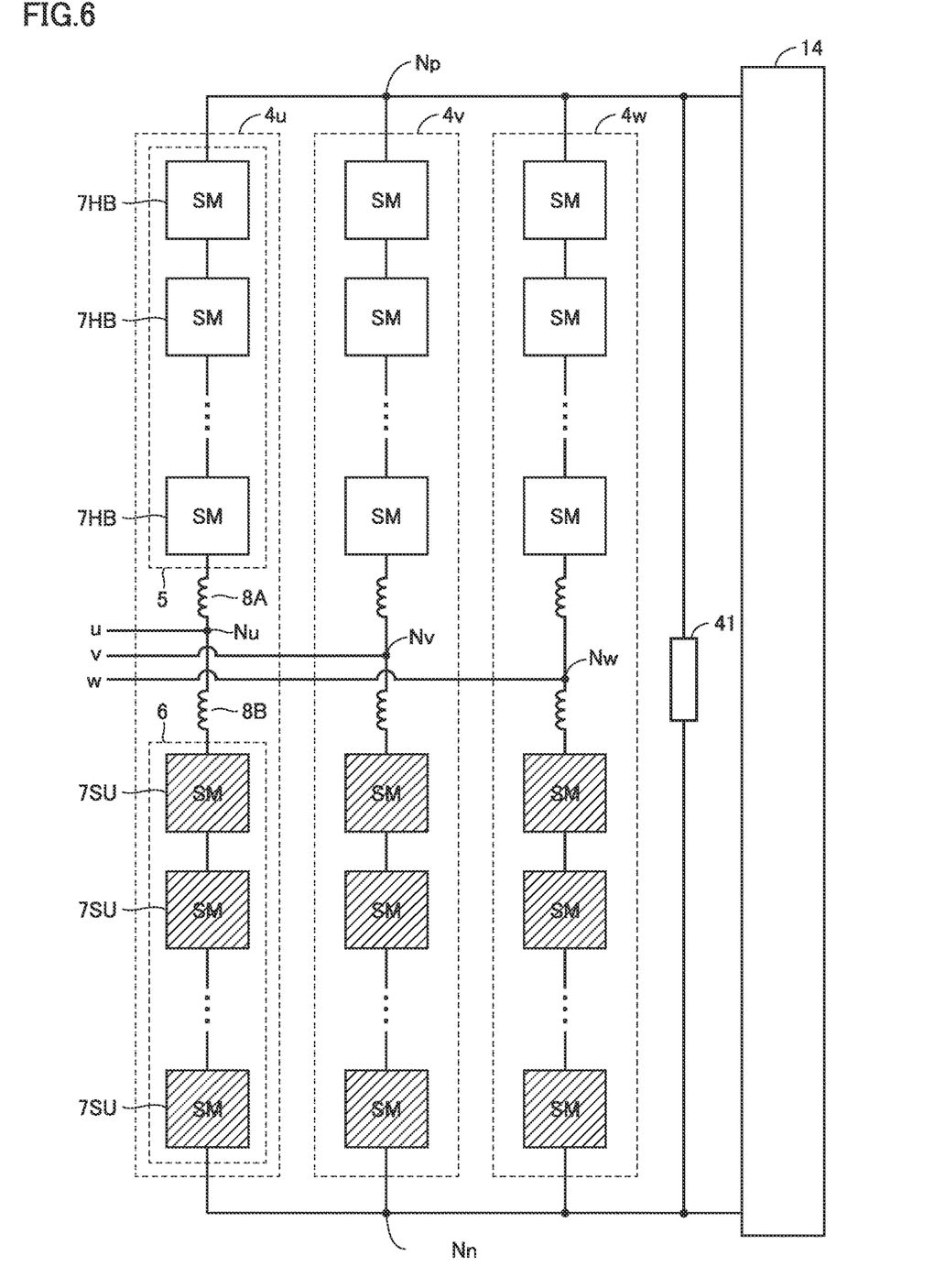
FIG. 6 is a diagram showing a configuration of a leg circuit according to the present embodiment.

FIG. 6 is a diagram showing a configuration of a leg circuit according to the present embodiment. Referring to FIG. 6, each sub module 7 included in upper arm 5 of each leg circuit 4 is implemented by sub module 7HB and each sub module 7 included in lower arm 6 is implemented by sub module 7SU.

As described above, when a maximum voltage of AC system 12 is equal to or lower than the total of voltages Vc, the short-circuiting current that flows in the direction from input/output terminal 26N toward input/output terminal 26P can be suppressed. An AC voltage that tends to cause the short-circuiting current to flow in the direction from input/output terminal 26P toward input/output terminal 26N is blocked by voltage Vc. When N sub modules 7 in total are included in leg circuit 4, a maximum value of the voltage of AC system 12 substantially corresponds to the sum of voltages Vc of N/2 sub modules 7. Therefore, by preparing at least N/2 sub modules 7SU that provide voltages Vc, the voltage of AC system 12 is equal to or lower than the total of voltages Vc and hence the short-circuiting current can be suppressed.

Typically, upper arm 5 and lower arm 6 are equal to each other in number of sub modules. Therefore, for example, by implementing all sub modules 7 in lower arm 6 with sub modules 7SU as shown in FIG. 6, the short-circuiting current can be suppressed.

More specifically, in order to suppress the short-circuiting current, sub modules 7SU in number larger than the number calculated by dividing the maximum value of the voltage of AC system 12 by voltage Vc of capacitor 24 (that is, the number of sub modules calculated as "maximum value of voltage of AC system"÷"voltage Vc") should only be provided in the path of the short-circuiting current. The resultant number calculated by this division is also referred to as a "calculated number K" below. Leg circuit 4 should only include calculated number K of sub modules 7SU, and any ratio between the number of sub modules 7SU included in upper arm 5 and the number of sub modules 7SU included in lower arm 6 may be set.

The present embodiment is configured such that sub modules 7SU in number necessary for protection against a short-circuiting fault in DC line 14 are provided, and other than these sub modules, sub module 7HB in the half-bridge configuration is provided. An overcurrent caused by short-circuiting in DC line 14 can thus be suppressed.

The number of sub modules 7SU can be suppressed to a minimum necessary number by calculating calculated number K, and hence the configuration can also be simplified. From a point of view of reduction in cost, rather than sub module 7FB in the full-bridge configuration, sub module 7HF in the 1.5 half-bridge configuration is preferably adopted as sub module 7SU. From a point of view of suppression of the short-circuiting current, for example, all sub modules 7 within each leg circuit 4 may be implemented by sub modules 7SU.

Configuration of Voltage Suppression Circuit

As set forth above, the power converter including the defined number of sub modules 7SU can suppress the short-circuiting current by turning off each switching element 22 in all sub modules 7 on the occurrence of the short-circuiting fault. In the absence of voltage suppression circuits 41 and 41A as in the present embodiment in power conversion system 100, however, when power converter 2 suppresses the short-circuiting current, an oscillatory voltage is generated due to current energy accumulated within DC line 14.

Figure 7:
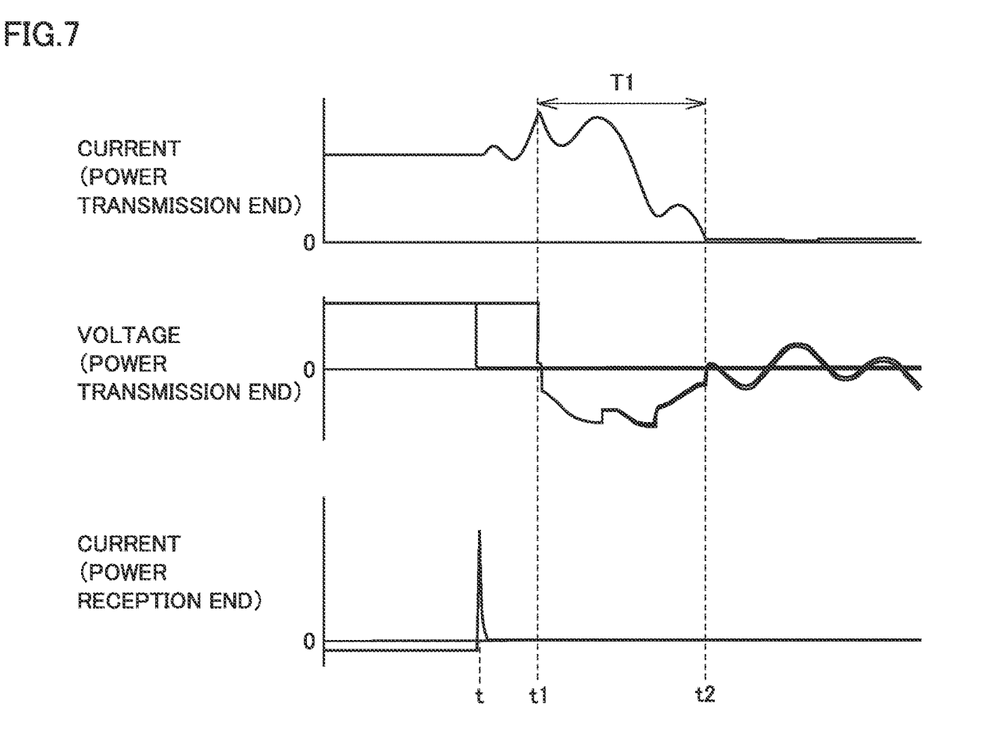
FIG. 7 is a diagram showing change over time of a current and a voltage of a DC line when a voltage suppression circuit is not provided in the power conversion system.

FIG. 7 is a diagram showing change over time of a current and a voltage of the DC line when the voltage suppression circuit is not provided in the power conversion system. Referring to FIG. 7, when the short-circuiting fault in DC line 14 occurs at the power reception end at time t, the short-circuiting current at the power reception end exceeds an overcurrent level, and at time t1, a voltage to ground (which is also referred to as a "power-transmission-end voltage" below) of DC line 14 on the positive side at the power transmission end oscillates in a negative direction. Thereafter, the power-transmission-end voltage is lowered with lowering in short-circuiting current at the power transmission end, and at time t2, the short-circuiting current at the power transmission end becomes substantially zero. A time period T1 represents time until the short-circuiting current at the power transmission end is interrupted. At time t2 or later as well, however, an oscillatory voltage is generated at the power transmission end, and it is estimated that recovery of insulation at a point of the fault is delayed. Therefore, it takes time to activate again each gate-blocked sub module 7.

Figure 8:
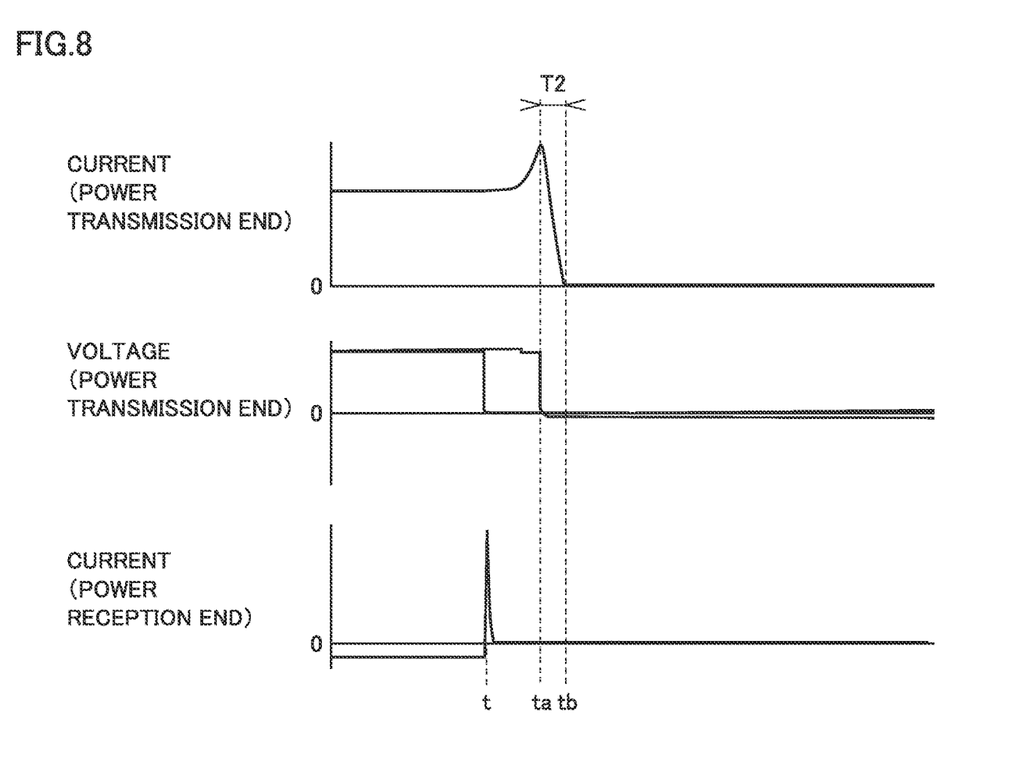
FIG. 8 is a diagram showing change over time of a current and a voltage of the DC line when the voltage suppression circuit is provided in the power conversion system.

FIG. 8 is a diagram showing change over time of a current and a voltage of the DC line when the voltage suppression circuit is provided in the power conversion system. Referring to FIG. 8, when the short-circuiting fault in DC line 14 occurs at the power reception end at time t, the short-circuiting current at the power reception end exceeds the overcurrent level. Though the short-circuiting current at the power transmission end increases from time t to time ta, it soon attains to zero at time tb. In addition, after the occurrence of the short-circuiting fault, the power-transmission-end voltage immediately attains to zero, and the oscillatory voltage as in FIG. 7 is not generated either. It is further understood that a time period T2 until the short-circuiting current at the power transmission end is interrupted is quite shorter than time period T1 in FIG. 7. This is because of absorption by voltage suppression circuit 41, of current energy accumulated in DC line 14.

Figure 9:
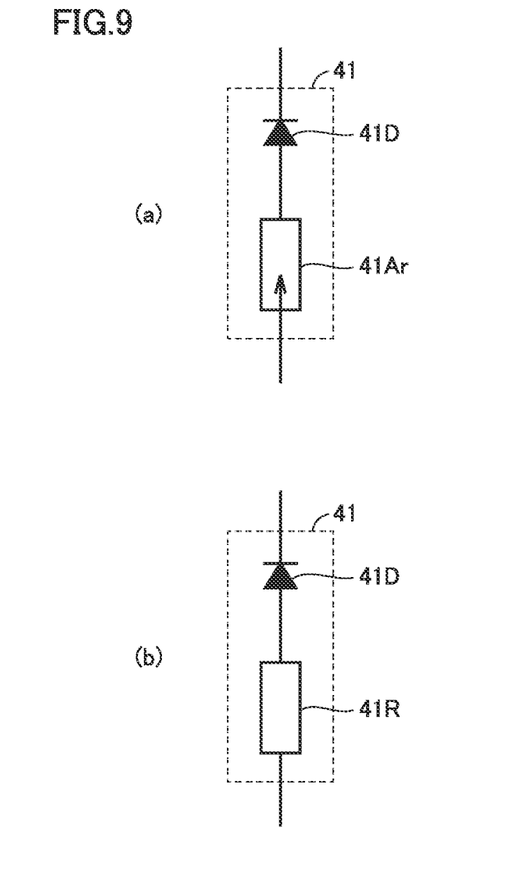
FIG. 9 is a diagram showing an exemplary configuration of the voltage suppression circuit.

FIG. 9 is a diagram showing an exemplary configuration of voltage suppression circuit 41. Voltage suppression circuit 41 is composed of a serial body of a diode and a current limiting element as shown in FIG. 9 (a) or (b). Specifically, voltage suppression circuit 41 shown in FIG. 9 (a) is composed of a serial body of a diode 41D and an arrester 41Ar which is the current limiting element. Voltage suppression circuit 41 shown in FIG. 9 (b) is composed of a serial body of diode 41D and a resistor 41R which is the current limiting element. Diode 41D plays a role to suppress oscillation by suppressing inversion of the voltage, and the current limiting element plays a role to absorb current energy accumulated in DC line 14. A clamping voltage of arrester 41Ar is set to a voltage lower than a rated voltage value of positive DC terminal Np (that is, a rated voltage value of DC voltage Vdcp) or a voltage lower than an absolute value of a rated voltage value of negative DC terminal Nn (that is, an absolute value of the rated voltage value of DC voltage Vdcp).

Voltage suppression circuit 41 is connected between DC line 14P on the positive side and DC line 14N on the negative side as shown in FIG. 1. In this case, diode 41D is arranged to restrict the current that flows from the positive side to the negative side. In other words, diode 41D has the anode and the cathode connected to the negative side and the positive side of DC line 14, respectively.

According to such voltage suppression circuit 41, current energy generated at the time of interruption of the short-circuiting current by power converter 2 and accumulated in DC line 14 can be absorbed and the short-circuiting current can quickly be attenuated. Consequently, time required for activation again of power converter 2 can be shortened.

Processing Procedure

Figure 10:
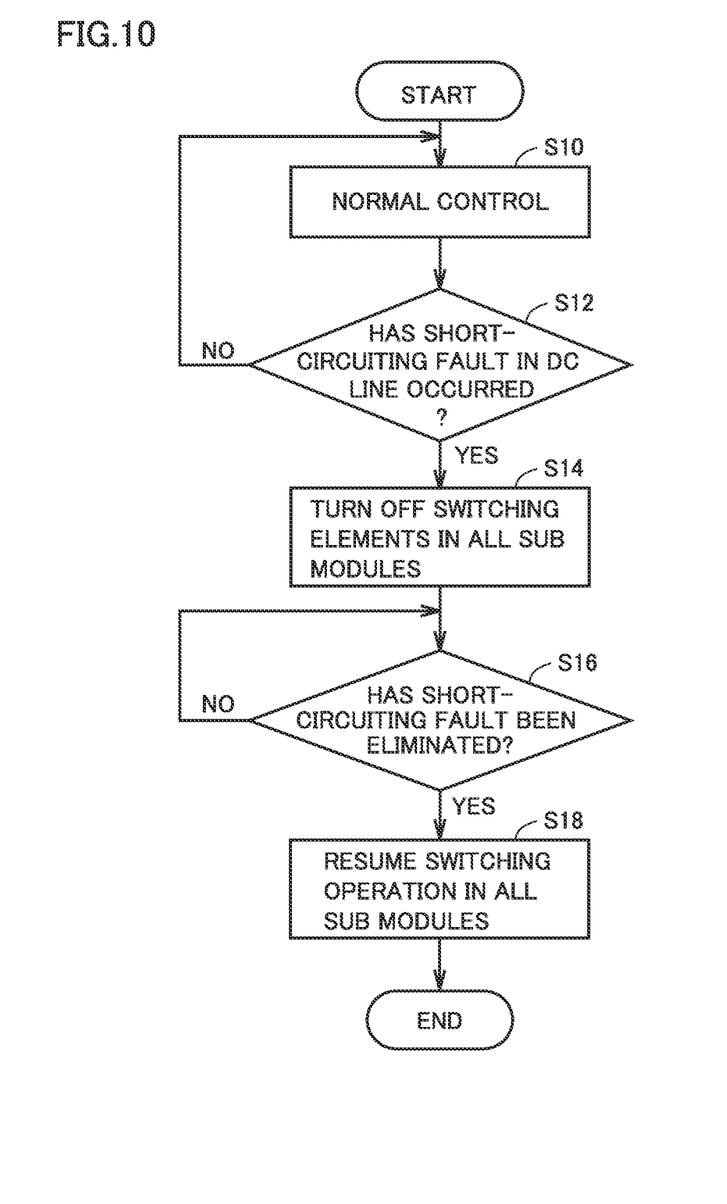
FIG. 10 is a flowchart showing a procedure of processing in a control device according to the present embodiment.

FIG. 10 is a flowchart showing a procedure of processing in control device 3 according to the present embodiment. Typically, an arithmetic processing unit of control device 3 performs each step below.

When initial charging (that is, initial charging of each capacitor 24) of power converter 2 is completed, control device 3 provides an operation start command and carries out normal control (step S10). Specifically, control device 3 controls an output voltage from each sub module 7 included in each leg circuit 4. In this case, in sub module 7SU, the output voltage is controlled by keeping switching element 22D always on and turning on and off switching elements 22A and 22B.

Then, control device 3 determines whether or not a short-circuiting fault in DC line 14 has occurred based on a current that flows in sub module 7 (step S12). For example, when at least one of absolute values of arm currents Ipu, Ipv, Ipw, Inu, Inv, and Inw detected by arm current detectors 9A and 9B exceeds a threshold value D1 or when a total value of the arm currents of all phases exceeds a threshold value D2, control device 3 determines that the short-circuiting fault in DC line 14 has occurred. When a current detector is provided on a side of the positive terminal of DC line 14 in order to detect a current that flows in sub module 7, control device 3 may determine whether or not a short-circuiting fault has occurred based on a DC current detected by the current detector. For example, when the detected DC current exceeds a threshold value D3, control device 3 determines that the short-circuiting fault has occurred.

When the short-circuiting fault has not occurred (NO in step S12), control device 3 performs processing in step S10. When the short-circuiting fault has occurred (YES in step S12), control device 3 turns off each switching element in all sub modules 7 included in each leg circuit 4 of power converter 2 (step S14). In this case, since each leg circuit 4 includes sub modules 7SU in number equal to or larger than calculated number K as described above, the short-circuiting current in DC line 14 is suppressed. Furthermore, since voltage suppression circuit 41 suppresses also the oscillatory voltage in DC line 14, the time period until the short-circuiting current is interrupted can be shortened.

Control device 3 determines whether or not the short-circuiting fault has been eliminated (step S16). Specifically, when the short-circuiting current has been interrupted and variation in voltage due to the short-circuiting fault has been suppressed, control device 3 determines that the short-circuiting fault has been eliminated. For example, when a state that DC voltage Vdcp of positive DC terminal Np (or DC voltage Vdcn of negative DC terminal Nn and DC voltage Vdc) is lower than a threshold value E continues for a reference time period or longer, control device 3 determines that the short-circuiting current has been interrupted and variation in voltage has been suppressed. Control device 3 may make this determination based on a current value. For example, when a state that each arm current is lower than a threshold value Ds and DC voltage Vdcp is lower than threshold value E continues for a reference time period or longer, control device 3 may determine that the short-circuiting current has been interrupted and variation in voltage has been suppressed.

In resumption of the operation of each sub module 7 (YES in step S16), control device 3 transmits a signal that permits the switching operation to each sub module 7 and resumes the switching operation of each sub module 7 (that is, deblocks each sub module 7) (step S18). Otherwise (NO in step S16), control device 3 performs processing in step S16.

Figure 11:
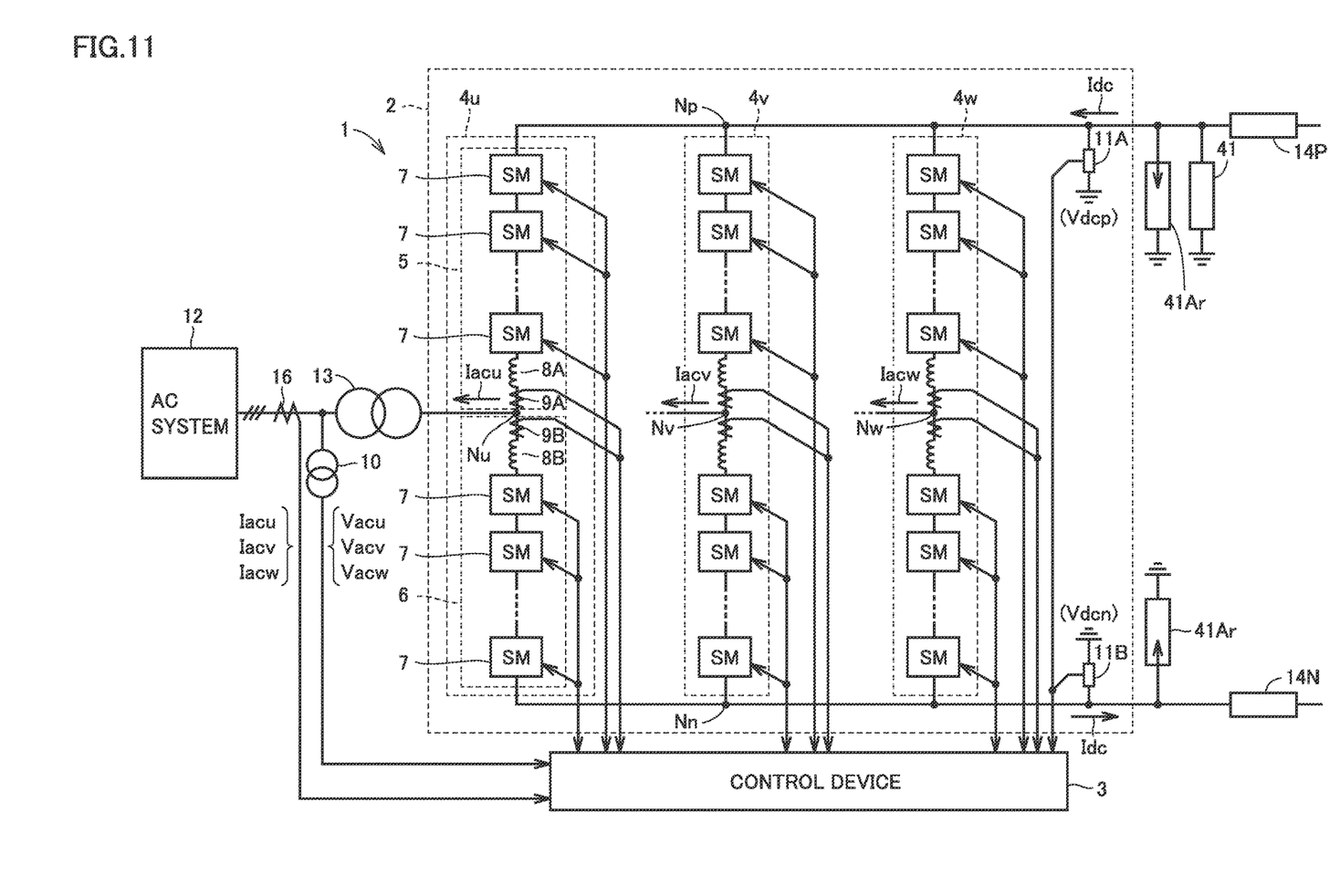
FIG. 11 is a diagram for illustrating another arrangement of the voltage suppression circuit.

Other Embodiments (1) Though a configuration in which voltage suppression circuits 41 and 41A are arranged between DC line 14P on the positive side and DC line 14N on the negative side is described in the embodiment described above, without being limited thereto, a configuration as shown in FIG. 11 may be adopted.

FIG. 11 is a diagram for illustrating another arrangement of voltage suppression circuit 41. Referring to FIG. 11, voltage suppression circuit 41 is connected between DC line 14P on the positive side and the ground. Arrester 41Ar is further connected between DC line 14P on the positive side and the ground. Arrester 41Ar is connected also between DC line 14N on the negative side and the ground. The configuration shown in FIG. 11 plays a role comparable to that of the configuration in which voltage suppression circuit 41 is arranged between DC line 14P on the positive side and DC line 14N on the negative side.

Therefore, in the configuration shown in FIG. 11 as well, current energy generated at the time of interruption of the short-circuiting current by power converter 2 and accumulated in DC line 14 can be absorbed and the short-circuiting current can quickly be attenuated. Consequently, the time period required for activation again of power converter 2 can be shortened.

(2) The configuration exemplified in the embodiment described above can be combined with another known technique or may be modified, for example, partially be omitted, within the scope not departing from the gist of the present embodiment. In the embodiment described above, the processing and the configuration described in other embodiments may be adopted and carried out as appropriate.

It should be understood that the embodiment disclosed herein is illustrative and non-restrictive in every respect. The scope of the present disclosure is defined by the terms of the claims rather than the description above and is intended to include any modifications within the scope and meaning equivalent to the terms of the claims.

REFERENCE SIGNS LIST

1, 1A power conversion device; 2, 2A power converter; 3, 3A control device; 4*u*, 4*v*, 4*w* leg circuit; 5 upper arm; 6 lower arm; 7, 7FB, 7HB, 7HF, 7SU sub module; 8A, 8B reactor; 9A, 9B arm current detector; 10 AC voltage detector; 11A, 11B DC voltage detector; 12, 12A AC system; 13, 13A transformer; 14, 14N, 14P DC line; 16 AC current detector; 22A, 22B, 22C, 22D switching element; 23A, 23B, 23C, 23D, 41D diode; 24 capacitor; 29 voltage detector; 26N, 26P input/output terminal; 31, 32, 33, 35 semiconductor circuit; 41, 41A voltage suppression circuit; 41Ar arrester; 41R resistor; 100 power conversion system

The invention claimed is:

1. A power conversion system that converts electric power between a DC line and an AC system, the power conversion system comprising:
a power converter including a plurality of leg circuits corresponding to a plurality of phases of the AC system, respectively;
a control device to control an operation of the power converter; and
a voltage suppression circuit connected to the DC line, wherein
each of the leg circuits includes a plurality of sub modules connected in series,
at least one of the plurality of sub modules is a first sub module,
a second sub module other than the first sub module is in a half-bridge configuration in which a second energy accumulation element and a third semiconductor circuit including two switching elements connected in series are connected in parallel,
the first sub module includes a first energy accumulation element, a first semiconductor circuit including a plurality of switching elements connected in series, and a second semiconductor circuit,
the first energy accumulation element, the first semiconductor circuit, and the second semiconductor circuit are connected in parallel to one another,
the number of first sub modules is larger than a number calculated by dividing a maximum value of a voltage of the AC system by a voltage of the first energy accumulation element,
the second semiconductor circuit is composed of a plurality of switching elements connected in series or composed of a switching element and a diode connected in series,
when the control device detects a short-circuiting fault in the DC line, the control device stops a switching operation of the plurality of sub modules included in each of the leg circuits,
the voltage suppression circuit is configured to suppress a voltage generated in the DC line when the switching operation of the plurality of sub modules is stopped,
the voltage suppression circuit is composed of a serial body of a diode and a current limiting element,
the voltage suppression circuit is connected between a positive side of the DC line and ground, and
a first arrester is connected between the positive side of the DC line and the ground, and a second arrester is connected between a negative side of the DC line and the ground.

2. The power conversion system according to claim 1, wherein
the current limiting element is an arrester or a resistor.

3. The power conversion system according to claim 1, wherein
when a state that a voltage of the DC line is lower than a threshold value continues for a reference time period or longer after the control device detects the short-circuiting fault in the DC line, the control device resumes the switching operation of the plurality of sub modules included in each of the leg circuits.

* * * * *